United States Patent [19]
Taisne

[11] 3,709,611
[45] Jan. 9, 1973

[54] APPARATUS FOR DERIVING ELECTRICAL SIGNALS

[75] Inventor: Jean Taisne, Fontenay sous Bois, France

[73] Assignee: Societe D'Optique Precision, Electronique Et Mecanique (SOPELEM), Paris, France

[22] Filed: March 3, 1971

[21] Appl. No.: 120,554

[52] U.S. Cl. ................................356/170, 250/237 G
[51] Int. Cl. ..............................................G01b 11/00
[58] Field of Search....356/169, 170, 167; 250/237 G

[56] References Cited

UNITED STATES PATENTS

| | | | |
|---|---|---|---|
| 3,529,170 | 9/1970 | Russell | 356/170 X |
| 3,599,004 | 8/1971 | Grendeimeier | 356/169 X |

*Primary Examiner*—Ronald L. Wibert
*Assistant Examiner*—J. Rothenberg
*Attorney*—Cameron, Kerkam & Sutton

[57] ABSTRACT

An apparatus for providing electrical signals representative of relative movement between two members includes a source of radiant energy conveniently light. A movement sensor fixed to one of the movable members comprises at least one detector responsive to energy from the source. A graduated track fixed to the other movable member is composed of a regular alternating series of marks and spaces capable of varying differently the energy from the source which is received by the detector by way of the track. Thus each detector provides a periodic undulating signal as the two members move relatively to one another. The or each signal is transformed by a reshaping device in which it is compared with a reference signal derived from at least one other detector exposed to energy from the source to derive a rectangular signal varying between one and the other of two logic levels. The reference signal may be derived by combining signals from two or more detectors exposed to energy from the source after modification by the track.

6 Claims, 16 Drawing Figures

A

| 420 | 421 | 422 | 423 | 424 | 425 |
|---|---|---|---|---|---|
| 0 | 0 | 1 | 1 | 0 | 0 |
| 1 | 0 | 1 | 1 | 1 | 0 |
| 2 | 0 | 0 | 1 | 1 | 0 |
| 3 | 0 | 0 | 1 | 1 | 1 |
| 4 | 0 | 0 | 0 | 1 | 1 |
| 5 | 1 | 0 | 0 | 1 | 1 |
| 6 | 1 | 0 | 0 | 0 | 1 |
| 7 | 1 | 1 | 0 | 0 | 1 |
| 8 | 1 | 1 | 0 | 0 | 0 |
| 9 | 1 | 1 | 1 | 0 | 0 |

B

| 430 | 431 | 432 | 433 | 434 | 435 |
|---|---|---|---|---|---|
| 0 | 0 | 0 | 0 | 0 | 0 |
| 1 | 0 | 0 | 0 | 0 | 1 |
| 2 | 0 | 0 | 0 | 1 | 1 |
| 3 | 0 | 0 | 1 | 1 | 1 |
| 4 | 0 | 1 | 1 | 1 | 1 |
| 5 | 1 | 1 | 1 | 1 | 1 |
| 6 | 1 | 1 | 1 | 1 | 0 |
| 7 | 1 | 1 | 1 | 0 | 0 |
| 8 | 1 | 1 | 0 | 0 | 0 |
| 9 | 1 | 0 | 0 | 0 | 0 |

| 440 | 441 | 442 | 443 | 444 | 445 |
|---|---|---|---|---|---|
| 0 | 0 | 0 | 1 | 0 | 1 |
| 1 | 0 | 1 | 1 | 0 | 1 |
| 2 | 0 | 1 | 0 | 0 | 1 |
| 3 | 0 | 1 | 0 | 1 | 1 |
| 4 | 0 | 1 | 0 | 1 | 0 |
| 5 | 1 | 1 | 0 | 1 | 0 |
| 6 | 1 | 0 | 0 | 1 | 0 |
| 7 | 1 | 0 | 1 | 1 | 0 |
| 8 | 1 | 0 | 1 | 0 | 0 |
| 9 | 1 | 0 | 1 | 0 | 1 |

| 450 | 451 | 452 | 453 | 454 | 455 |
|---|---|---|---|---|---|
| 0 | 0 | 0 | 1 | 1 | 0 |
| 1 | 0 | 0 | 1 | 0 | 0 |
| 2 | 0 | 1 | 1 | 0 | 0 |
| 3 | 0 | 1 | 1 | 0 | 1 |
| 4 | 0 | 1 | 0 | 0 | 1 |
| 5 | 1 | 1 | 0 | 0 | 1 |
| 6 | 1 | 1 | 0 | 1 | 1 |
| 7 | 1 | 0 | 0 | 1 | 1 |
| 8 | 1 | 0 | 0 | 1 | 0 |
| 9 | 1 | 0 | 1 | 1 | 0 |

APPARATUS FOR DERIVING ELECTRICAL SIGNALS

The invention relates to improvements in apparatus for deriving electrical signals representative of the relative movement between two members. Apparatus of this kind includes a source of radiant energy, a movement sensor fixed to one member and comprising at least one detector responsive to energy from the source, at least one graduated track fixed to another said member, the track being disposed in the path of radiant energy passing from the source to the detector and being composed of a regular, alternating series of masks and spaces capable of varying differently the energy received by the detectors of the sensor by way of the masks or spaces, so that upon relative movement of the two elements, the or each detector provides a periodic undulating signal.

The transmitter may, for example, be a light source, the track comprising transparent areas separated by opaque intervals, and the detectors being photoelectric cells which upon movement relative to the track provide a substantially trapezoidal periodic signal of which each period comprises, in succession, an upper level, a descending slope, a lower level and a rising slope corresponding respectively to the passage of the detector across a transparent area, from this area to the next interval, across an opaque interval, and from this interval to the next area.

Obviously, the scanning device could provide periodic signals by means of some other system, for example a system based on a graduated track having locally different magnetic properties and the periodic signal need not necessarily be trapezoidal, but may merely undulate.

To increase the number of date items obtained from one pitch distance of the track it is usual to use a plurality of spaced detectors.

The width of the rising and descending slopes which correspond to the passage of the detector across the boundaries of a mask may be reduced by means of gratings, which enable the gradient of these slopes to be increased. It is impossible, however, to obtain vertical slopes, and for this reason, to provide a precise indication of the positions of the scanning device relative to the track giving instructions to a coding system, each undulating signal transmitted by a detector is generally transformed into a rectangular signal varying from one to the other of two logic levels, by means of a shaping device comprising a comparator which compares this undulating signal with a reference signal, the reshaped signal being a logical "1" if the undulating signal is above the reference signal, and being a logical "0" if the undulating signal is below the reference signal. A conventional coding system can then give a coded indication of the position of the scanning device on the track by direct processing or by combining the rectangular signals so shaped.

In conventional systems, the reference signal is a signal of strictly constant power, applied to the comparators for comparison with the signals provided by detectors. If the power of the source of radiant energy, in this case the light source, should vary, the amplitude of the signals transmitted by the detectors will fluctuate, so that the position of the detector at which the shaped signal changes from "0" level to "1 " is not precisely determined. To avoid such fluctuations the light must be regulated to ensure constant illumination and a stable signal. This regulation of the light is not always perfect, however, and it requires special apparatus which invariably increases the complexity and cost of the movement sensor.

According to the present invention there is provided apparatus for providing electrical signals representative of relative movement between two members, comprising a source of radiant energy, a movement sensor fixed to one said member and comprising at least one detector responsive to energy from said source, at least one graduated track fixed to the other said member, the track being disposed in the path of radiant energy passing from the source to the detector and being composed of a regular, alternating series of masks and spaces capable of varying differently the energy received by the detector or detectors of the sensor by way of the masks or spaces, each detector providing upon relative movement of the two elements, a periodic undulating signal, transformed, by a reshaping device comprising a comparator for comparing each periodic signal with a reference signal, into a rectangular signal alternating between one and the other of two logic levels, wherein the periodic signal produced by each detector is compared with at least one reference signal derived from at least one other detector exposed to energy from said source.

Preferred features and advantages of embodiments of the invention will now be described in more detail with reference to the accompanying diagrammatic drawings, of which:

FIGS. 1*a* and 1*b* illustrate an embodiment using a scanning device with two detectors;

FIGS. 2*a*, 2*b* and 2*c* illustrate a practical embodiment using a four-element binary code, using a scanning device with four detectors;

FIGS. 3*a*, 3*b* and 3*c* illustrate a practical embodiment using a five-element decimal code, using a scanning device with five detectors;

FIG. 4 gives the decoding tables for the various codes obtained by combining the detectors in the device shown in FIG. 3;

In a preferred embodiment of the invention, the reference signal compared with the signal transmitted by one detector is the signal transmitted by one of the other detectors of the sensor, or a signal obtained by combining signals transmitted by a plurality of detectors in the sensor.

Figures 1, 1A, 1B, 2, 2A, 2B, 2C:
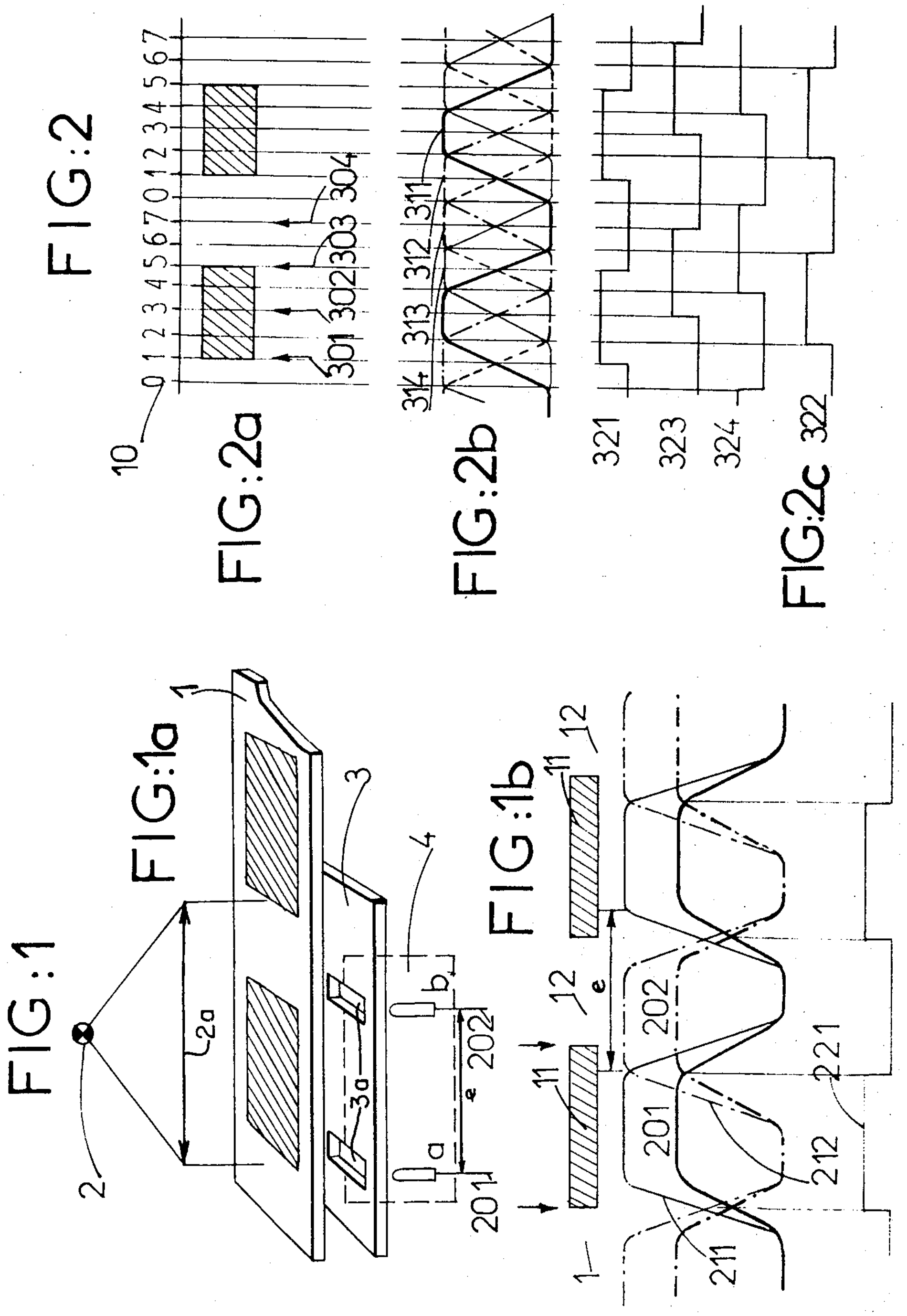

In the embodiment shown in FIG. 1*a*, the source of radiant energy is a light source 2 which, by way of a condensor 2*a*, supplies a parallel beam light to illuminate a track 1, composed of masks 11 separated by spaces 12.

A sensor 4 comprises two detectors *a* and *b* spaced from one another at a distance *e*. As a result of this spacing of the detectors, the signals 201 and 202 (FIG. 1*b*) provided by the two detectors are out of phase.

A square-wave signal 221 is obtained by comparing the signals 201 and 202 provided by the detectors *a* and *b*. It is at the "0" logic level if the amplitude of the signal 201 is less than that of the signal 202, and at the "1" level if the amplitude of signal 201 is greater than that of the signal 202.

If the detectors *a* and *b* are identical, a variation in the power of the transmitter will cause identical fluctuations in the signals 201 and 202. As seen in FIG. 1*b*, the signals 201 and 202, which become 211 and 212, are in this case altered similarly so that the abscissae of the points of intersection of the two signals do not change. As a result, pulses produced when the signal 221 passes from the 0 level to the 1 level, and vice versa, will correspond to perfectly precise positions of the scanning device relative to the track 1, whatever the fluctuations of the light source. If the detectors are not identical, signals of the same amplitude and fluctuating in identical manners can be obtained simply by re-establishing the level of one of the signals in a known manner. It will be noted that in the case illustrated, in which the patches and intervals are not equal, the reshaped signal obtained will still remain regularly periodic as a result of the symmetry of the system.

The slope of the transition portions of the detector signals is increased to a desired extent by an aperture plate 3 provided between the track 1 and the detectors *a*, *b*. The slots 3*a* in plate 3 limit to a desired extent the length of the track 1 from which light may fall upon each detector.

FIGS. 2*a*, 2*b* and 2*c* illustrate the application of the invention to a scanning device with four detectors, giving a binary code with four moments.

Figure 6:
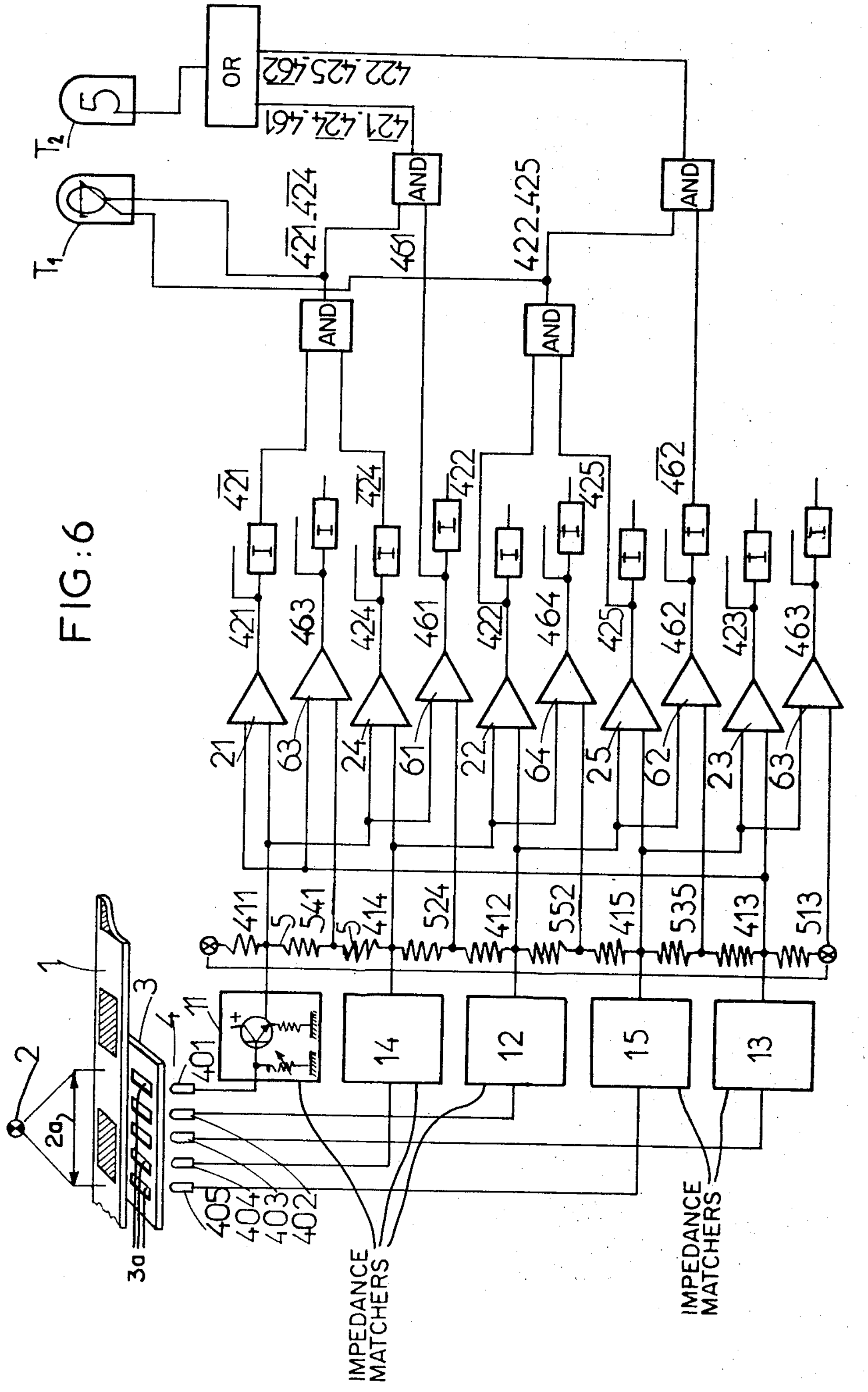
FIG. 6 is an operational diagram for the devices for scanning and for reshaping the signals obtained in the arrangement shown in FIG. 5.

The graduated track 1 (FIG. 2*a*) is formed of masks separated by spaces of equal widths. The detectors, represented only by arrows 301, 302, 303, 304 are separated by distances equal to half the width of one mask. A device of this kind, of course, will develop four data items over the width of a mask or space, the scale 10 on which movement is measured therefore having eight units per track pitch. As shown in FIGS. 1 and 6, a grating 3 may be inserted between the track 1 and the scanning device 4. This grating has a slit opposite to each detector, and permits regulation of the width of the rising and descending slopes of the signals transmitted by the detectors when they pass the boundary of a patch or interval. In the case illustrated in FIG. 2*b*, the rising and descending slopes have widths equal to two units, as do the upper and lower levels of the signals. Each rising slope in the signal from a detector is therefore intersected at its middle and also close to its two ends by the descending slopes of the respective signals from the other detectors, and vice versa.

The rising slopes of the signal 311 from the detector 301 are therefore intersected at the bottom by the signal 314, in the middle by the signal 313 and at the top by the signal 312. FIG. 2*c* shows the signals 321, 322, 323, 324 obtained from the signals 311, 312, 313, 314. The signal 321 is obtained by comparing the signals 311 and 313; it is at the 0 level where 313 is greater than 311, and at the 1 logic level where 313 is weaker than 311. The reshaped signals 322, 323, 324 are obtained in the same way, as indicated below:

321:comparison of 313 and 311 - level 0 if 313 is greater than 311

322:comparison of 313 and 314 - level 0 if 313 is greater than 314

323:comparison of 312 and 314 - level 0 if 312 is greater than 314

324:comparison of 311 and 314 - level 0 if 311 is greater than 314

Combination of the detector signals shown in FIG. 2*c* gives an 8-base code indicated on the following truth table:

TABLE I

| | 321 | 322 | 323 | 324 |
|---|---|---|---|---|
| 0 | 0 | 0 | 0 | 0 |
| 1 | 1 | 0 | 0 | 0 |
| 2 | 1 | 1 | 0 | 0 |
| 3 | 1 | 1 | 1 | 0 |
| 4 | 1 | 1 | 1 | 1 |
| 5 | 0 | 1 | 1 | 1 |
| 6 | 0 | 0 | 1 | 1 |
| 7 | 0 | 0 | 0 | 1 |

As the Figure shows, other combinations of signals may be chosen, in which case other codes, represent by other truth tables, are obtained. This special and important feature of the invention will be seen in more detail in the following example described with reference to FIGS. 3*a*, 3*b* and 3*c*.

Figures 3, 3A, 3B, 3C:
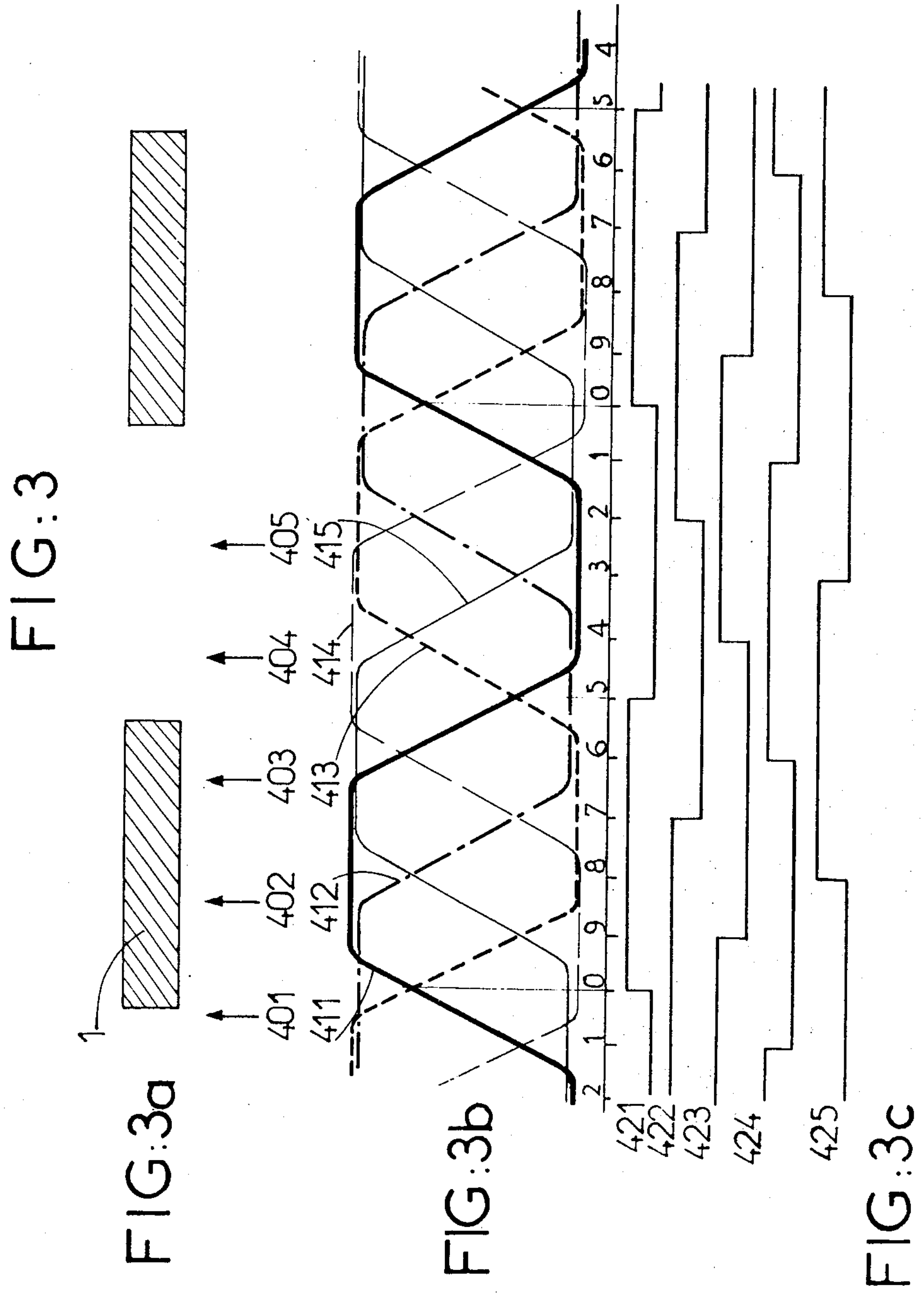

In the embodiment shown in FIG. 3, the track 1, formed of alternate masks 11 and spaces 12 of equal width is scanned by a device with five detectors giving a five-moment decimal code. The increment in the scale is therefore equal to a fifth of the width of a mask (FIG. 3*a*). The detectors indicated only by arrows and designated 401, 402, 403, 404, 405 are spaced two increments apart from one another, giving trapezoidal signals 411, 412, 413, 414, 415 (FIG. 3*b*), which are offset relative to one another by two increments, the slits in the gratings (not shown) being set so that the rising and descending slopes correspond to a width of two increments.

The signal 411 from the first detector is compared with a signal 412 from a second detector, offset relative to the first by a distance such that the ends of the upper and lower level portions of the signal from the second detector will occur between the ends of the upper and lower level portions of the signal from the first detector, and so on. This ensures that any two signals will always differ from one another, so that comparison between them will give a signal reshaped into a rectangular form. It will be appreciated that, for example, the signal 411 may be compared with the signals 414 and 413, the signal 413 with the signals 411 and 415, and so forth.

FIG. 3*c* shows the reshaped signals 421, 422, 423, 424, 425 obtained by comparing the signals two by two, the detectors being combined as follows:

421:comparison of 411 and 413 - level 1 if 411 is greater than 413

422:comparison of 412 and 414 - level 1 if 412 is greater than 414

423:comparison of 413 and 415 - level 1 if 413 is greater than 415

424:comparison of 414 and 411 - level 1 if 414 is greater than 411

425:comparison of 415 and 412 - level 1 if 415 is greater than 412

Figures 4, 7:
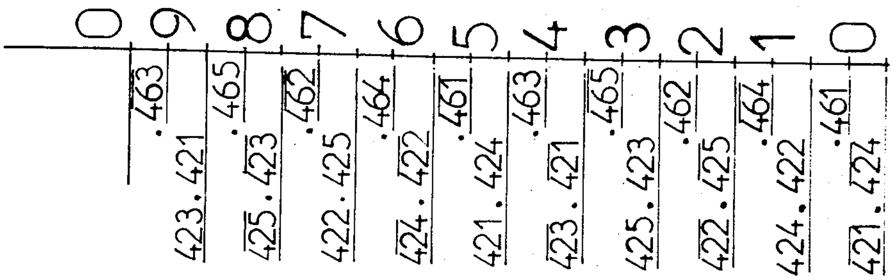
FIG. 7 illustrates the operation of the circuits used for decoding, according to the positions of the scanning device.

The truth table 420 for the resulting decimal code is given in FIG. 4 at A.

Since every signal from one detector may be compared with any two other signals from two of the other detectors, it is possible to obtain three other codes 430, 440, 450, for which, also, the verity tables are given in FIG. 4 at B, C and D. The reshaped signals 431, 432, 433, 434, 435, 441, 442, 443, etc., are obtained as follows:

431:comparison of 411 and 413 - level 1 if 411 is greater than 413

432:comparison of 415 and 413 - level 1 if 415 is greater than 413

433:comparison of 415 and 412 - level 1 if 415 is greater than 412

434:comparison of 414 and 412 - level 1 if 414 is greater than 412

435:comparison of 414 and 411 - level 1 if 414 is greater than 411

441:comparison of 411 and 413 - level 1 if 411 is greater than 413

442:comparison of 414 and 411 - level 1 if 414 is greater than 411

443:comparison of 412 and 414 - level 1 if 412 is greater than 414

444:comparison of 415 and 412 - level 1 if 415 is greater than 412

445:comparison of 413 and 415 - level 1 if 413 is greater than 415

451:comparison of 411 and 413 - level 1 if 411 is greater than 413

452:comparison of 415 and 412 - level 1 if 414 is greater than 412

453:comparison of 413 and 415 - level 1 if 413 is greater than 415

454:comparison of 411 and 414 - level 1 if 411 is greater than 414

455:comparison of 415 and 412 - level 1 if 415 is greater than 412

It will be appreciated that, by using the invention, the scanning device can therefore be adapted to give any other five-element decimal code, without changing the arrangement of the detectors in the scanning device. If the device is designed to give a particular code, for example 430, a changeover to a machine using another code, for example 450, can be made merely by modifying the connections between the detectors and the comparators, without using any transcoding matrix and without altering the arrangement of the detectors. This is one of the important advantages of a device embodying the invention.

Other, highly advantageous possibilities of the invention will be considered in the following examples.

Figure 5:
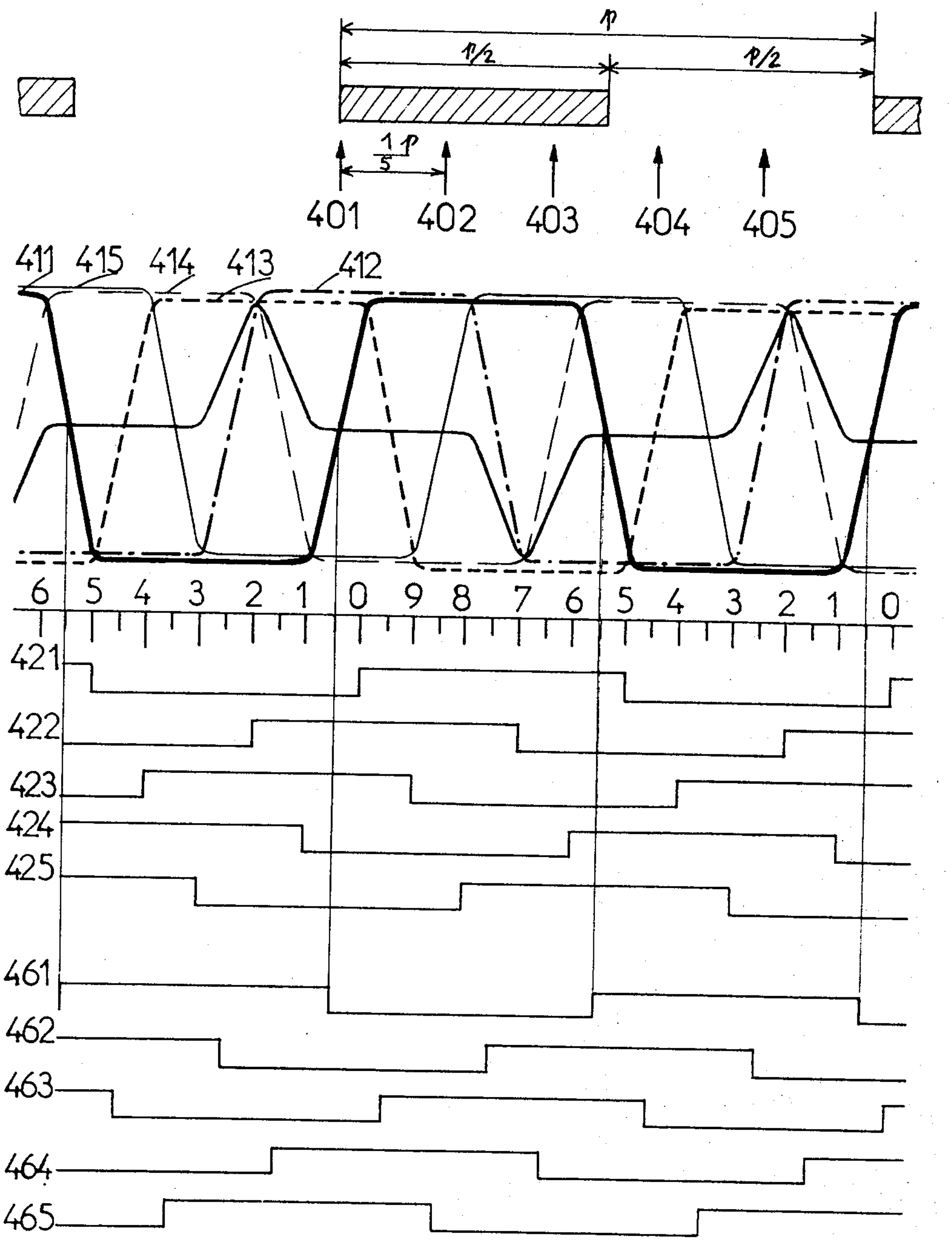
FIG. 5 shows a variant of the invention, for the device with five detectors.

In the embodiment shown in FIG. 5, the scanning device and graduated track 1 are identical to those shown in FIG. 3. The scanning device, therefore, has five detectors offset by spaces equal to two-fifths of the width of a mask or interval. Such a device normally, of course, gives a decimal code, the pitch *p* of the track being equal to ten increments. The slits in the aperture plate are narrowed so that the rising and descending slopes of the signals correspond to movement of the detector through *p*/10. The intersections between signals are therefore situated, not in the centers of the slopes as in FIG. 3, but at the ends of the slopes, just before the beginnings of the level portions. Comparison of the signals is still possible, however, if signals varying in opposite directions are compared. When the signals are compared in the same way as in the case of FIG. 3, that is to say, 411 is compared with 413, 412 with 414, 413 with 415, 414 with 411, and 415 with 412, reshaped signals 421, 422, 423, 424, 425 are obtained which, when combined, give a decimal code whose increment is equal to *p*/10. Intermediate signals will then be formed, these being obtained by combining signals of which, for the same position of the scanning device, one has a high level and the other a low level, the combined signal so obtained being compared with a signal which has a rising or descending slope for the same position of the scanning device. In the case shown in FIG. 5, each intermediate signal is obtained by forming half the sum of two other signals. To avoid unclarity in the drawing, only the intermediate signal 524 derived from half the sum of the signals 414 and 412 is shown. As the drawing shows, when the scanning device is in a position between 0 and 1 on the scale, that is, a position corresponding to a rising slope in the signal 411, the signal 412 has a high level and the signal 414 a low level. Under these conditions, the signal 524 obtained by forming half the sum of the signals 412 and 414 has, for the same zone, an intermediate level which bisects the rising slope of the signal 411 at its center, that is, at a position corresponding to the 0.5 division of the scale. By symmetry, the same intermediate signal 524 has an intermediate level between the positions 5 an 6, bisecting the corresponding descending slope of the signal 411 at its center, that is, at a position corresponding to 5.5. Comparison of the intermediate signal 524 with the signal 411 gives the reshaped signal 461, which is at the 1 logic level when 411 is smaller than 524, and at the 0 logic level when 411 is greater than 524. The change of logic level capable of producing pulses in a coding system will therefore arise when the scanning device is in the positions corresponding to 0.5 and 5.5 on the scale. In the same way corresponding intermediate signals (not shown) may be formed:

535: corresponding to the half-sum of the signals 413 and 415

541: corresponding to the half-sum of the signals 414 and 411

552: corresponding to the half-sum of the signals 415 and 412

513: corresponding to the half-sum of the signals 411 and 413

By comparing each signal from a detector with the intermediate signal having central level portions in the zones corresponding to the rising and descending slopes of the signal from that detector, the reshaped signals 461, 462, 463, 464 and 465 are obtained as follows:

461:comparison of 411 and 524 - level 1 if 411 is smaller than 524

462:comparison of 412 and 535 - level 1 if 412 is smaller than 535

463:comparison of 413 and 541 - level 1 if 413 is smaller than 541

464:comparison of 414 and 552 - level 1 if 414 is smaller than 552

465:comparison of 415 and 513 - level 1 if 415 is smaller than 513

Simple comparison of each signal from a detector with another signal from a detector or with a combination of a plurality of signals from different detectors, therefore, permits twice as many increments to be scanned within one pitch. In the case of FIG. 5, the increment of the code obtained is equal to *p*/20 and the truth table of this code is as follows:

TABLE II

| | 421 | 422 | 423 | 424 | 425 | 461 | 462 | 463 | 464 | 465 |
|---|---|---|---|---|---|---|---|---|---|---|
| 0 | 0 | 1 | 1 | 0 | 0 | 0 | 0 | 0 | 1 | 1 |
| 0.5 | 0 | 1 | 1 | 0 | 0 | 1 | 0 | 0 | 1 | 1 |
| 1 | 0 | 1 | 1 | 1 | 0 | 1 | 0 | 0 | 1 | 1 |
| 1.5 | 0 | 1 | 1 | 1 | 0 | 1 | 0 | 0 | 0 | 1 |
| 2 | 0 | 0 | 1 | 1 | 0 | 1 | 0 | 0 | 0 | 1 |
| 2.5 | 0 | 0 | 1 | 1 | 0 | 1 | 1 | 0 | 0 | 1 |
| 3 | 0 | 0 | 1 | 1 | 1 | 1 | 1 | 0 | 0 | 1 |
| 3.5 | 0 | 0 | 1 | 1 | 1 | 1 | 1 | 0 | 0 | 0 |
| 4 | 0 | 0 | 0 | 1 | 1 | 1 | 1 | 0 | 0 | 0 |
| 4.5 | 0 | 0 | 0 | 1 | 1 | 1 | 1 | 1 | 0 | 0 |
| 5 | 1 | 0 | 0 | 1 | 1 | 1 | 1 | 1 | 0 | 0 |
| 5.5 | 1 | 0 | 0 | 1 | 1 | 0 | 1 | 1 | 0 | 0 |

This table shows clearly that a reflected code is obtained, by means of which twenty positions can be distinguished over the length of one pitch of the track. For known means to give the same result, it would have been necessary to transmit two reference signals of constant amplitude and to compare these with the signals from the detectors, with the imprecision and disadvantages due to amplitude variations which were recalled above.

An embodiment of apparatus for carrying out the invention is shown diagrammatically in FIG. 6.

The graduated track 1, bearing transparent masks separated by opaque spaces, is illuminated by a light source 2 supplying parallel light through a condenser 2*a*. The scanning device 4 passes along the track 1, each detector being situated behind an individual slit in an aperture plate 3. Adjacent detectors 401, 402, 403, 404 and 405 of the scanning device 4 are shown in this drawing as separated by spaces equal to two-tenths of the track pitch. In view of the smallness of the pitch, of course, this distance would in practice usually be increased by a multiple of the pitch.

The electrical signals supplied by the detectors in accordance with their position opposite the scale are converted into a family of intersecting signals 411, 412, 413, 414 and 415 by impedance matchers 11, 12, 13, 14 and 15, each comprising a transistor and a variable resistance to give an identical amplitude to the signals 411 to 415. If the detectors were identical, of course, this re-establishment of the level would not be necessary, but the variable resistances would still enable the levels of the upper and lower signal levels to be regulated.

The terminals of the impedance matchers 11 to 15 are connected two by two as described above, by identical resistances 5 in order to give an intermediate signal equal to the half-sum of the signals applied to the terminals of the resistances. As a result, for example, the signal 541 is obtained at the common terminal of the two resistances 5 which are connected to the outputs of the impedance matchers 11 and 14, the signal transmitted being therefore equal to half the sum of the signals 411 and 414. The family of signals 411 to 415 and the intermediate signals 541, 524, 552, 535 and 513 are compared two by two in comparators 21 to 25 and 61 to 65, which transmit reshaped signals 421 to 425 and 461 to 465.

The decoding circuit follows directly from a reading of the truth table given above. By way of example, the decoding logic for the positions 0, 0.5, 7 and 7.5 is illustrated. These positions are displayed on an indicator tube T1 for units, with a wire for each cathode from 0 to 9, and an indicator tube T2 for half-units which displays the figure 5 when appropriate.

The inverse signal corresponding to each reshaped signal is formed by means of an individual inverter I. The device then has a group of AND gates and an OR gate, so that the signals and inverse signals can be associated in accordance with the truth table.

These signals $\overline{421}$ and $\overline{424}$, therefore, are sent to an AND gate providing the signal $\overline{421}.\overline{424}$ which lights up the O cathode. The same signal is passed with the signal 461 to an AND gate providing the signal $\overline{421}.\overline{424}.461$, which, by way of an OR gate, lights up the 5 cathode in the tube T2. In the same way the signal 422.425, connected to the 7 cathode in the tube T1, and the signal 422.425.$\overline{462}$, passed to the tube T2 by way of the same OR gate, are formed.

The decoding circuits for the other positions of the scanning device, which follow directly from the truth table and are indicated on the scale in FIG. 7, may readily be realized in a similar manner.

Tens of units may, of course, be discriminated in any known manner, for example by adding to the graduated scale a second scale of which the graduations are equal to the pitch of the lower scale. The example shown in FIGS. 5 and 6 uses an intermediate signal equal to half the sum of two signals of the family to scan an increment equal to a tenth of the pitch. It is possible, of course, to generalize by recombining the signals to give other intermediate signals. For example, two signals on each side of the mean signal used in the preceding example could be added, to give a family of five intermediate signals intersecting the rising and descending slopes of the network signal at five places. This permits discrimination of 2/10 of a unit, that is, of an increment equal to 1/50 of the pitch.

FIGS. 8, 8*a*, 8*b* and 8*c* illustrate, by way of example, a single family of intermediate signals 5241, 5242, 5243, 5244 and 5245 obtained by combining the signals 412 and 414 from the detectors 402 and 404. It will be noted that the signal 5243 corresponds to the signal 524 in FIG. 5.

Figure 8A:
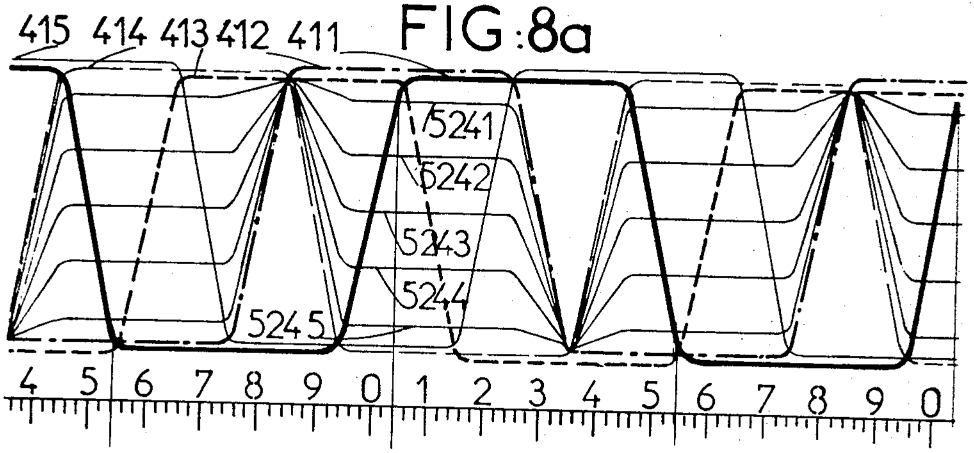
FIG. 8 illustrates a device embodying another variant of the invention, used in the case of the scanning device with five detectors.
Figure 8B:
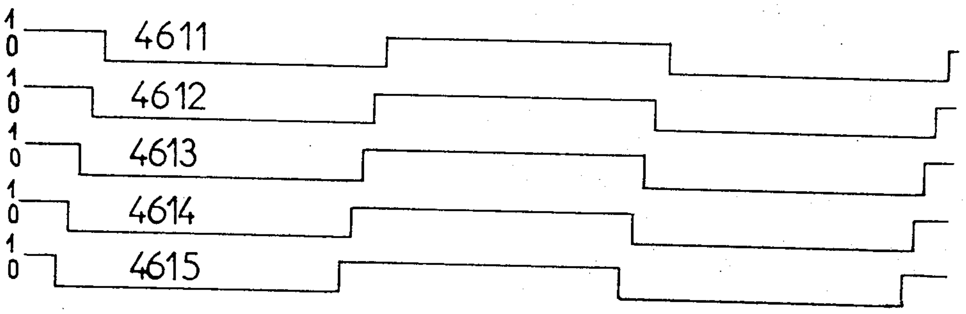
Figure 8C:
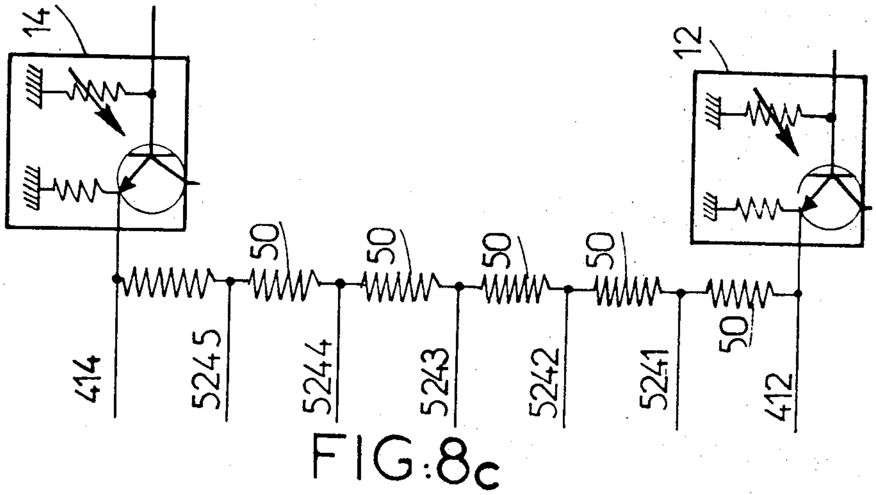

As in the preceding embodiments, the intermediate signals are easily obtained by potentiometric division as indicated in FIG. 8*c*, by providing, between the output terminals of impedance matchers 12 and 14, six identical resistances 50 connected in series, at the terminals of which the signals 5241 and 5245 are obtained.

Comparison of the intermediate signals so obtained with the signal 411 gives reshaped signals 4611, 4612, 4613, 4614 and 4615 which, as shown in FIG. 8*b*, make it possible after decoding to distinguish respectively the positions 0.4 and 5.4; 0.2 and 5.2; 0 and 5; 9.8 and 4.8; and 9.6 and 4.6.

In the same way, each of the other signals in the network is compared with five intermediate signals obtained by combination from two other detectors, one with a high level and the other a low level for those positions of the scanning device corresponding to a rising or descending slope of the signal concerned.

Obviously, the invention is by no means restricted to the details of the embodiment and examples which have been described. Clearly, once the device for scanning the graduated track has more than one detector, each signal from one detector can be compared with the signal from another detector, or with another signal produced by combining a plurality of signals from different detectors. Although in the embodiments described the signals of the family have been combined two by two to form intermediate signals, more than two detectors could, of course, be combined to form other intermediate signals, the important fact being that the intermediate signals so produced have level portions which intersect the slopes of another signal at suitable positions, the signals compared preferably varying in opposite directions with the movements of the scanning device, in order to facilitate their comparison. It is possible, therefore, to compare two signals of which one intersects the other at the end of an upper level portion, whereas the other intersects it at the beginning of an upper level portion, as in FIG. 2, provided that the signals vary in opposite directions. If, however, the intersection is sharp, for example when an intermediate level offers a level stretch which intersects the network signal in the middle of a slope, two signals varying in the same direction may be compared. Thus it would have been possible, in the case of FIG. 5, to compare the signal 524 with the signal from the network 413.

Although the examples have been described with reference to a scanning device with five detectors providing a five-element decimal code, the invention could, of course, be applied to any other code using a plurality of detectors. Similarly, there is no limit theoretically to the number of intermediate signals obtained, since merely increasing the gain of the impedance matcher is enough to permit a larger number of divisions to be distinguished in the interval corresponding to a rising slope in the signal, and this interval can also be adjusted by changing the width of the slits in the grating.

Obviously, the decoding system shown in FIG. 6 has been given by way of example, and any other known decoding system could be substituted for it. Also, the pulses supplied by the signals, which in the example shown in FIG. 6 operate the numerical position indicator tubes, could be used in any known manner, for example in a computer.

In the examples shown, the reference signal of intermediate signals were obtained from signals provided by the detectors in the movement sensor, this embodiment being particularly advantageous. In some cases, especially if the sensor has only one detector, the signal from this detector could be compared with a reference signal from another detector, which receives the same energy from the transmitter, but is independent of the sensor and may be situated between the transmitter and the track. The reshaped signal so obtained would remain independent of fluctuations in the transmitter.

What we claim is:

1. Apparatus for providing electrical signals representative of relative movement between two members, comprising a source of radiant energy, a movement sensor fixed to one of said members, said sensor including at least one detector responsive to energy from said source, at least one graduated track fixed to the other of said members, the track being disposed in the path of radiant energy passing form the source to the sensor said track having a regular, alternating series of masks and spaces varying differently the energy received by the detectors of the sensor through the masks or spaces, each detector providing, upon relative movement of the two members, a periodic undulating signal, a caparator for comparing the amplitude of each periodic signal with that of at least one reference signal and providing a rectangular signal alternating between one and the other of two logic levels, said at least one reference signal being derived from at least one other detector responsive to energy from said source.

2. Apparatus in accordance with claim 1, in which the sensor includes a plurality of spaced detectors, and the reference signal with which each periodic signal produced by a detector is compared is a periodic signal produced by one of the other of said detectors.

3. Apparatus in accordance with claim 1, in which the periodic signal transmitted by each detector is a substantially trapezoidal signal comprising within each period, in succession, an upper level portion, a descending slope, a lower level portion and a rising slope, corresponding respectively to the passage of the said detector across a mask, from this mask to the adjacent space, across this space and from this space to the next mask, the trapezoidal signals being phase-shifted by the spacing of the detectors, a second of said detectors producing the reference signal compared with the signal transmitted by a first of said detectors and being spaced from said first detector by a distance such that the phase shift between the signals is at least equal to the length of the longest of said level portions and at most equal to the distance between two of the said upper level portions.

4. Apparatus in accordance with claim 1, said sensor having a plurality of spaced detectors, means for comparing each periodic signal produced by a detector with at least one reference signal and means for obtaining said reference signal by combining the signals produced by at least two others of said detectors.

5. Apparatus in accordance with claim 4, each periodic signal produced by a detector having a substantially trapezoidal signal comprising within each period in succession, an upper level portion, a descending slope, a lower level portion and a rising slope, corresponding respectively to the passage of said detector across a mask, from this mask to the adjacent space, across this space and from this space to the next mask, the trapezoidal signals being phase-shifted by the spacing of said detectors, the reference signal compared with the trapezoidal signal transmitted by a first of said detectors being an intermediate signal of two signals transmitted by two others of said detectors, one of said two signals being an upper level signal and the other a lower level signal over at least a part of the regions in which the signal transmitted by said first detector has a rising or descending slope.

6. Apparatus in accordance with claim 4 including means for comparing each signal produced by one of said detectors with a plurality of intermediate signals having regularly spaced level portions intersecting the rising and descending slopes of the signal produced by said one of said detectors.

* * * * *